United States Patent
Yang et al.

(10) Patent No.: US 8,279,256 B2
(45) Date of Patent: Oct. 2, 2012

(54) MOBILE COMMUNICATION TERMINAL AND METHOD FOR PROVIDING SUBSTITUTE IMAGES FOR VIDEO CALL

(75) Inventors: Myung Kyu Yang, Seoul (KR); Soo Ryeol Kim, Seoul (KR); Chan Ki Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1336 days.

(21) Appl. No.: 11/935,909

(22) Filed: Nov. 6, 2007

(65) Prior Publication Data

US 2008/0117283 A1 May 22, 2008

(30) Foreign Application Priority Data

Nov. 16, 2006 (KR) .......................... 10-2006-0113113

(51) Int. Cl.
*H04N 7/14* (2006.01)
(52) U.S. Cl. .................................. 348/14.02; 348/14.01
(58) Field of Classification Search .... 348/14.01–14.12, 348/14.13, 14.14, 14.15; 455/414.1, 556.1
See application file for complete search history.

(56) References Cited

U.S. PATENT DOCUMENTS

| 2004/0201667 A1* | 10/2004 | Hasegawa ................. 348/14.02 |
| 2005/0070312 A1* | 3/2005 | Seligmann et al. ........ 455/456.6 |

FOREIGN PATENT DOCUMENTS

| JP | 2000-324463 | 11/2000 |
| KR | 1020010054009 | 7/2001 |
| KR | 1020020049391 | 6/2002 |
| KR | 1020040035522 | 4/2004 |
| KR | 1020060036643 | 5/2006 |

* cited by examiner

*Primary Examiner* — Brian Ensey
(74) *Attorney, Agent, or Firm* — The Farrell Law Firm, P.C.

(57) ABSTRACT

A mobile communication terminal and method for proving a substitute image are provided, which automatically searches a substitute image suitable to a video call and transmits the substitute image to the opposite party. A user's image is automatically recorded during a video call, and tagged with information related to the time and situation of the recording, such as location information and time information. The tagged image is stored as a substitute image. When transmission of a substitute image is set while a video call is performed, a substitute image having situation information consistent with or similar to a corresponding situation is searched and then transmitted to the opposite party. Therefore, when a mobile communication terminal performs a video call in various situations, a substitute image suitable to a corresponding situation can be provided to an opposite terminal.

13 Claims, 5 Drawing Sheets

MOBILE COMMUNICATION TERMINAL AND METHOD FOR PROVIDING SUBSTITUTE IMAGES FOR VIDEO CALL

PRIORITY

This application claims priority under 35 U.S.C. §119(a) to an application entitled "MOBILE COMMUNICATION TERMINAL AND METHOD FOR PROVIDING SUBSTITUTE IMAGES FOR VIDEO CALL" filed in the Korean Intellectual Property Office on Nov. 16, 2006 and assigned Serial No. 2006-0113113, the contents of which are incorporated herein by reference.

BACKGROUND OF THE INVENTION

1. Field of the Invention

The present invention relates to a video call of a mobile communication terminal. More particularly, this invention relates to a mobile communication terminal that can automatically search for a proper substitute image and provide the substitute image thereto during a video call, and to a method for providing the substitute image for the video call using the same.

2. Description of the Related Art

With the development of mobile communication technology and terminal manufacturing technology, state-of-the-art mobile communication terminals provide various add-on functions as well as the traditional phone call service. For example, the mobile communication terminal allows a user to exchange images with an opposite party, download moving images from a server, or play on-line games via wireless Internet. Specifically, video call functions are increasingly sought after due to the spread of mobile communication terminals having a high-performance camera. As high-speed data transmission technology, such as High Speed Downlink Packet Access (HSDPA), etc., is commercialized, it is expected that the amount of video calls use via mobile communication terminals will increase.

In general, a conventional video call using a mobile communication terminal exposes a location from where a user performs a video call, and thus does not protect the user's privacy. To compensate for this problem, a method has been proposed where an image behind a user performing a video call is changed. Or, a method where, instead of transmitting a current image of the video call user, another image that has been previously recorded is substituted and then transmitted thereto, in which the latter method is called a substitute image-transmitting method.

However, the conventional method for transmitting a substitute image is disadvantageous in that a user must film moving images for respective substitute images and store them, or must directly set to record the user's images during a video call and then store them, which is complicated. Also, the conventional method causes an inconvenience to a user because the user must designate ahead of time one of the stored images for a substitute image or must select one of a plurality of images for each video call. In addition, although a substitute image has been designated ahead of time, a user must change a substitute image for each video call.

SUMMARY OF THE INVENTION

In order to solve the above problems, the present invention provides a mobile communication terminal that can automatically search for and provide a substitute image suitable to a corresponding situation during a video call, and a method for providing the substitute image for the video call using the same.

The present invention provides a mobile communication terminal that can automatically store a user's image and provide the image to be used as a substitute image during a video call, and a method for providing the substitute image for the video call using the same.

The present invention provides a mobile communication terminal that can store a variety of information used to search for and provide a suitable substitute image, along with a user's image, during a video call, and a method for providing the substitute image for the video call, using the same substitute image.

In accordance with an aspect of the present invention, there is provided a mobile communication terminal for providing a substitute image for a video call. The terminal includes a camera for capturing an image; a transceiver for performing transmission/reception of a signal; an image processor for processing an image signal inputted through the camera or the transceiver; a display for displaying the image processed by the image processor; a storage unit for storing the substitute image; a locating reading unit for receiving a location signal; and a controller for searching for one of substitute images stored in the storage unit, which has information, similar to information related to current situation including current location checked by the location-reading unit, and for transmitting the searched substitute image to an opposite terminal.

In accordance with another aspect of the present invention, there is provided a method for providing a substitute image for a video call. The method includes generating a call for a video call; determining whether transmission for the substitute image is set; and based on the determination, storing an image, captured by the camera when the video call is initiated, together with situation information, or after searching for a substitute image having situation information consistent with or similar to a current video call situation, transmitting the substitute image to an opposite party when the video call is initiated.

Preferably, the situation information is information to search for a substitute image suitable to a corresponding situation during a video call. Here, the situation information includes time information, such as A.M. or P.M, and hour and minute; location information related to the location or movement situation of a mobile communication terminal, such as a cell ID or Global Positioning System (GPS) information; and opposite party identification information, such as phone number, name or IDentification (ID) of an opposite party.

BRIEF DESCRIPTION OF THE DRAWINGS

The above and other features and advantages of the present invention will be more apparent from the following detailed description in conjunction with the accompanying drawings, in which.

DETAILED DESCRIPTION OF PREFERRED EMBODIMENTS

Hereinafter, embodiments of the present invention are described in detail with reference to the accompanying drawings. In the drawings, the same or similar elements are denoted by the same reference numerals even though the elements are depicted in different drawings. In the following description, a detailed description of known functions and configurations incorporated herein will be omitted when it may make the subject matter of the present invention less clear.

Figure 1:
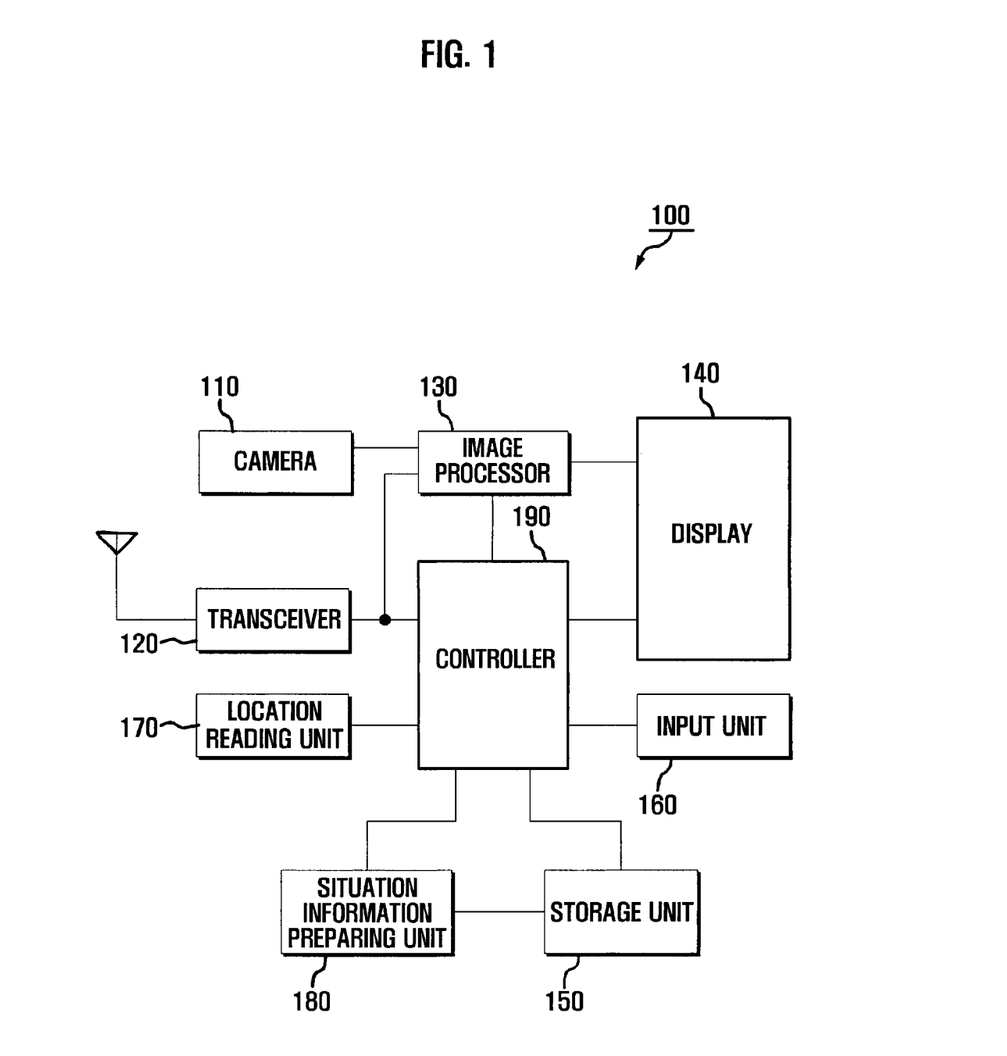
FIG. 1 is a schematic block diagram illustrating a mobile communication terminal for providing a substitute image for a video call, according to the present invention.

As shown in FIG. 1, the mobile communication terminal 100 is includes a camera 110, which photographs images. A transceiver 120 transmits/receives a signal. An image processor 130 processes an image signal input through the camera 110 or the transceiver 120. A display 140 displays information. A storage unit 150 stores data. An input 160 unit inputs a user's indication. A location-reading unit 170 receives a location signal. A situation information-preparing unit 180 prepares information related to photographing situations that include location information checked by the transceiver 120 or the location-reading unit 170, in which the information is hereinafter referred to as situation information. And, a controller 190 controls the units 110-180. Specifically, the controller 190 stores images, captured by the camera 110, together with the situation information, prepared by the situation information-preparing unit 180, in the storage unit 150. As well, the controller 190 searches for a substitute image with situation information in the storage unit 150, which is consistent with or similar to a current video call situation, and transmits the substitute image to an opposite party's terminal.

The transceiver 120 transmits/receives control signal and data through an antenna. The transceiver 120 receives a base station signal to provide time information or terminal location-related information thereto. The transceiver 120 may be configured to include at least one of a wireless communication unit, such as a short-range wireless communication module or an Radio Frequency (RF) module, etc., and a wired communication unit that is connected to a transit trunk, such as a subscriber line or an optical fiber cable, etc., to perform communication. Here, the short-range wireless communication module refers to a device fabricated based on Infrared Data Association (IrDA) technology or Bluetooth® technology.

The image processor 130 processes an image signal inputted through the camera 110 according to the control of the controller 190, in which the processed image signal is outputted to transceiver 120 or the display 140 or stored in the storage unit 150 under the control of the controller 190. As well, the image processor 130 processes an image signal inputted through the transceiver 120 according to the control of the controller 190, in which the processed image signal is outputted to the display 140 or stored in the storage unit 150 under the control of the controller 190.

The display 140 displays images created as the image processor 130 inputs the image signal from the transceiver 120 or the camera 110 and processes it, thereby allowing a video call to be performed or a scene to be captured. Meanwhile, the display 140 may be implemented by a touch-panel having an input function of the input unit 160, thereby performing input and display functions for information or data.

The input unit 160 may be implemented by a keypad or various input means equivalent thereto, such as a touch panel, a touch pad, etc. Also, the input unit 160 may be configured to include a voice input unit for inputting a voice.

The location-reading unit 170 receives a location signal and calculates a current location based thereon, thereby providing location information including the current location and a movement situation. The location-reading unit 170 is implemented by a Global Positioning System (GPS) module or a Radio Frequency IDentification (RFID) module, or units for reading location, equivalent thereto. The location-reading unit 170 may be configured as an Integrated Circuit (IC) chip as the location-reading unit is combined with the controller 190.

The situation information-preparing unit 180 includes information in an image captured while making the video call, information related to a photo capturing situation, including location information on where a video call is being made. For example, the information is included in a header of image data in a tag format or tagged in a portion equivalent to the header. The situation information-preparing unit 180 may be configured as a part of the controller 190. Also, the situation information-preparing unit 180 may be configured as an IC chip as the situation information-preparing unit is combined with the controller 190.

The controller 190 is operated such that when a video call is performed and a setting to transmit a substitute image is enabled, a current situation of the video call is compared with situation information of substitute image data previously stored in the storage unit 150 to search for a substitute image consistent with or similar to the situation information; and the searched image is transmitted to an opposite party's terminal through the transceiver 120. Meanwhile, when a setting to transmit a substitute image is disabled, the controller 190 stores an image captured by the camera 110 while making a video call and the situation information prepared by the situation information-preparing unit 180 in the storage unit 150. The situation information may be prepared and stored in a tag format.

The situation information refers to information to search for a substitute image suitable to a corresponding situation while making a video call, in which such information includes time information, such as A.M. or P.M, and hour and minute; location information related to the location or movement situation of a mobile communication terminal, such as a cell ID or GPS information; opposite party identification information, such as phone number, name or IDentification (ID) of an opposite party; and information equivalent thereto, for use in each classification and search.

That is, the controller 190 determines whether transmission for a substitute image is set when receiving or sending a call for a video call. For example, the controller 190 checks whether a user has previously entered settings, so that a substitute image can be transmitted when making a video call, or whether there is an input for setting substitute image transmission and then determines whether transmission for a substitute image has been set. If the transmission for a substitute image has not been set, the controller 190 automatically stores images captured by the camera 110 in the storage unit 150 when a video call is initiated. Specifically, the controller 190 tags the image date with time information of when the image was captured, information identifying opposite parties, such as a phone number of an opposite party when making a current video call, and location information of a current mobile communication terminal that can be identified by the location-reading unit 170 or the transceiver 120, and then stores them in the storage unit 150.

As well, if the transmission for a substitute image has been set, the controller 190 searches for one of the substitute images having been stored in the storage unit 150, which has situation information consistent with or similar to current situation information. For example, the controller determines whether a substitute image has information consistent with or similar a current time, or location information consistent with or similar to location information including a movement state of a current mobile communication terminal, or identification information consistent with a phone number of an originating end from a receiving call (or a phone number of an terminating end from a sending call), thereby searching for a substitute image suitable for a current vide call situation. When searching for a substitute image has been completed and a video call is initiated, the controller 190 transmits the searched substitute image to an opposite party through the transceiver 120. The transmission of the substitute image continues until the video call is terminated or the user sets to stop the transmission of the substitute image.

The controller 190 can operate the camera 110 to capture an image of the user and store the user's images while the camera 100 is transmitting the substitute image. That is, recording an image for a substitute image and making a video call using other substitute image can be simultaneously performed. Here, the controller 190 can store the captured images together with situation information, prepared by the situation information-preparing unit 180, in the storage unit 150.

The transmission of a substitute image is set by setting a menu before initiating a video call, or by inputting a hot key (or shortcut key) or setting a corresponding menu when making a video call, or by inputting an input equivalent thereto.

Also, when the number of substitute images resulting from the search is more that two, the controller 190 displays the searched substitute images in a list or in any other display-style on the display 140, for easy selection. When the user selects one of the displayed substitute images, the controller 190 transmits the selected substitute image to the opposite party through the transceiver 120.

Although the drawings do not illustrate this, the mobile communication terminal 100 may be configured to selectively further include units having add-on functions as follows: a storage medium inserting unit that receives external storage media for storing data, such as a memory card, etc.; a broadcasting receiver module; an audio signal output unit such as a speaker; connecting terminals for exchanging data with external digital devices; a recharging terminal; a battery for supplying power; a digital music source reproducing module, such as an MP3 module; and modules for electronic trade or mobile banking, etc. With the spread of digital convergence, although the present mobile communication terminals are too various to list their modifications in this description, it will be easily appreciated to those skilled in the art that the other units equivalent the above-listed units may be further included to the mobile communication terminal 100 according to the present invention.

Figure 2:
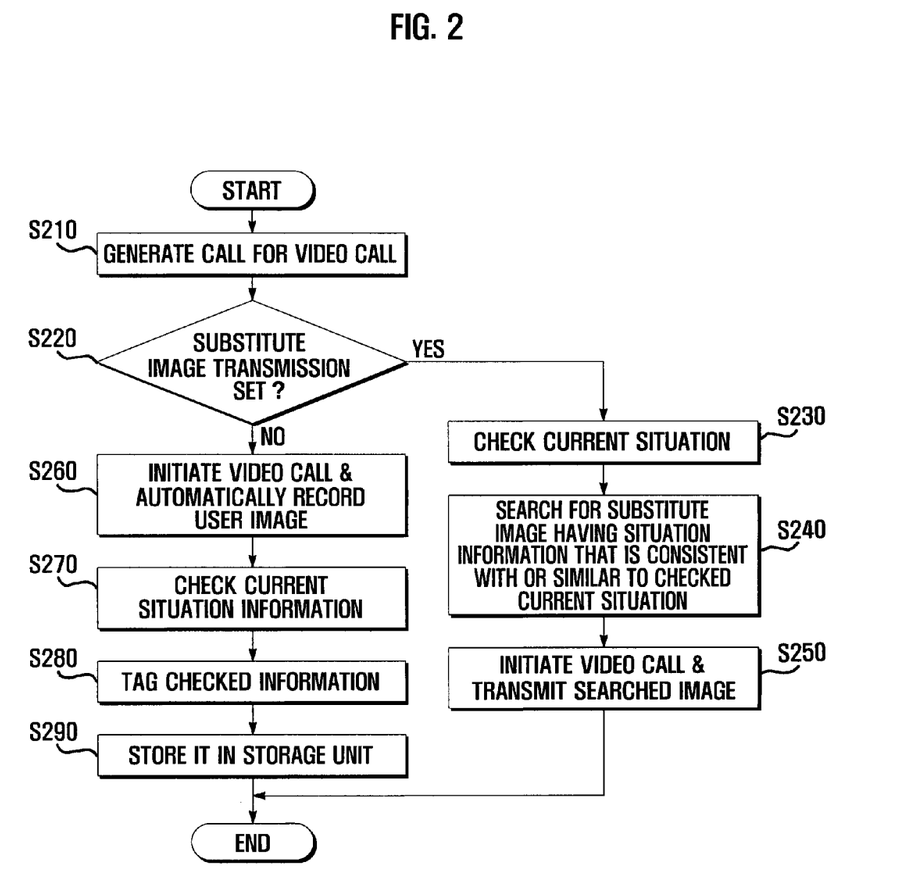
FIG. 2 is a flow chart describing a method for providing a substitute image for a video call, according to an embodiment of the present invention.

FIG. 2 is a flow chart describing a method for providing a substitute image to a video call, according to the present invention.

As shown in FIG. 2, the method includes generating a call for a video call, in Step S210; determining whether a transmission of a substitute image is set, in Step S220; based on the determination of Step S220, storing an image together with situation information in Steps S230-S250, in which the image is captured by the camera when the video call is initiated, or, after searching for a substitute image having situation information consistent with or similar to a current video call situation, transmitting the substitute image to an opposite party when the video call is initiated, in Steps S260-S290.

More specifically, when a call for a video call is generated, in Step S210, or a call for a video call is received or sent, the controller 190 of the mobile communication terminal determines whether transmission for a substitute image is set, in Step S220. When the determination of Step S220 is positive, the controller 190 checks a current video call situation to transmit a substitute image suitable to the current video call situation information, in Step S230. After completing the check, the controller 190 searches for a substitute image having situation information consistent with or similar to the checked current video call situation, in Step S240. Next, the controller 190 transmits the searched substitute image to the opposite party's terminal, when the video call is initiated, in Step S250.

On the other hand, when the determination of Step S220 is negative, or the controller determines that a live image of the current user will be transmitted to the opposite party's terminal while making the video call, the controller 190 automatically records image captured by the camera when the video call is initiated, in Step S260. Next, the controller 190 checks situation information related to the current video call situation, in Step S270, and then tags the recorded image with the checked situation information, in Step S280. Then, the controller 190 stores the recorded image tagged by the checked situation information in a storage unit, such as a substitute image-storing box.

Meanwhile, although the drawings do not illustrate this, the method for providing a substitute image according to the present invention may further include, after completing the search of Step S240, when the number of the searched substitute images is more than two, displaying the searched substitute images in a list on the display of the mobile communication terminal so that the user can easily select from the searched substitute images using a preview function; and transmitting one of the searched substitute images, selected by the user, to the opposite party's terminal.

As described above, the situation information refers to information to search for a substitute image suitable to a corresponding situation while making a video call. That is, the information includes: time information, such as A.M. or P.M., a current time (hour and minute); location information related to location or movement situation of a mobile communication terminal, such as a cell ID or GPS information; and opposite party identification information, such as phone number, name or IDentification (ID) of an opposite party.

Figure 3:
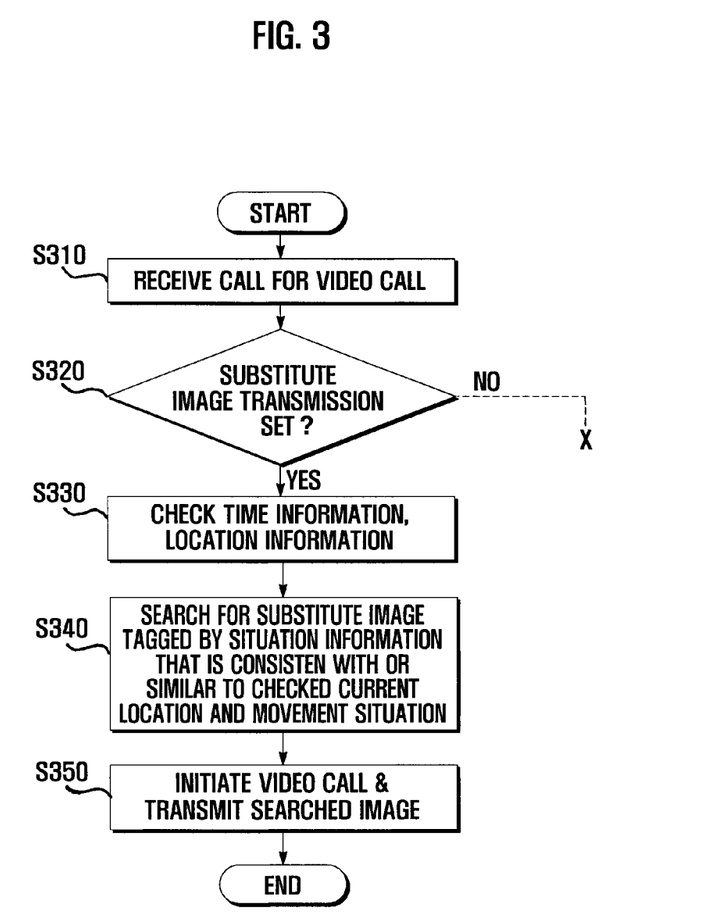
FIG. 3 is a flow chart describing a process where situation information is tagged in a user image to store the substitute image, according to an embodiment of the present invention.
Figure 4:
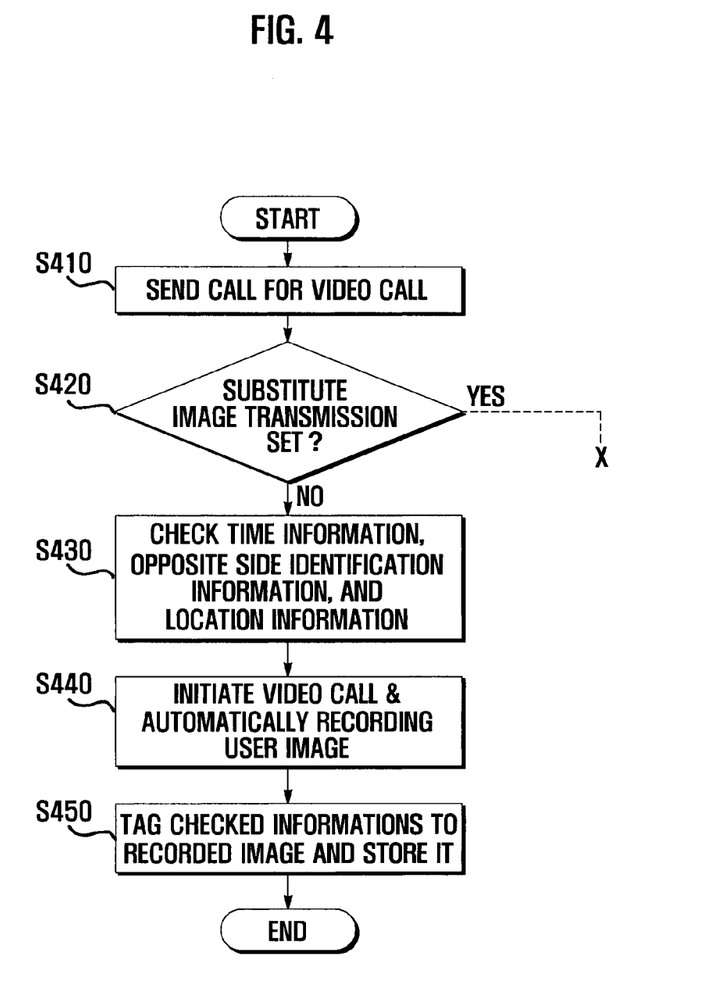
FIG. 4 is a flow chart describing a process where a substitute image is searched and transmitted during a video call, according to an embodiment of the present invention.
Figure 5:
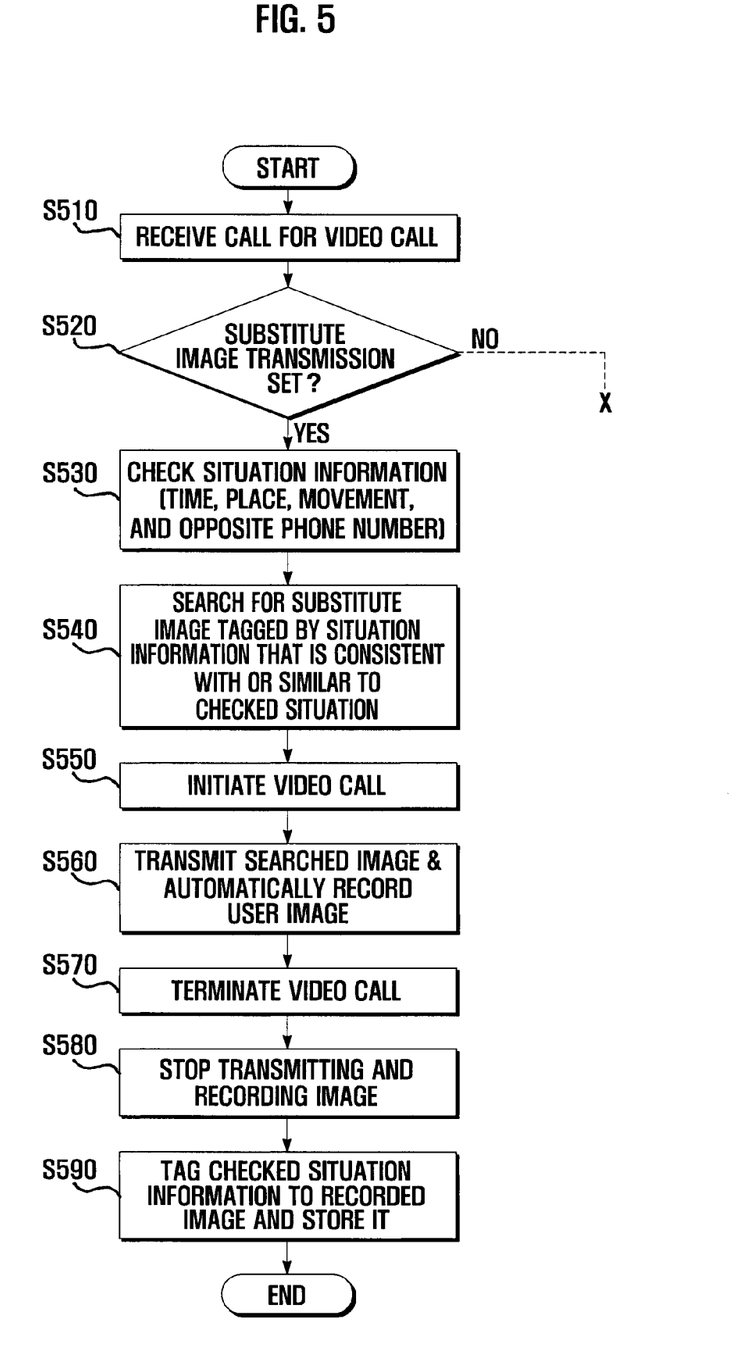
FIG. 5 is a flow chart describing a process where a substitute image is stored and transmitted, simultaneously, according to an embodiment of the present invention.

Referring to FIGS. 3 to 5, the method for proving a substitute image for a video call according to the present invention will be described in detail.

FIG. 3 is a flow chart describing a process where situation information is tagged in a user image to store the substitute image, according to the present invention.

As shown in FIG. 3, when a call for a video call is received, in Step S310, the controller 109 of the mobile communication terminal determines whether a transmission for a substitute image is set and checks that the transmission is set, in Step S320. The controller 190 checks a current time, as a current video call situation, through base station time information, etc., and checks whether the mobile communication terminal is moved, and a current location as checking cell ID or GPS information, etc., in Step S330. Next, the controller 190 searches for tags of previously stored substitute images to search for a substitute image that is tagged with time information consistent with or similar to the current time, and situation information consistent with or similar to the checked current location and movement situation, in Step S340. After completing the search, when the video call is initiated, the controller 190 transmits the searched substitute image to the opposite party.

FIG. 4 is a flow chart describing a process where a substitute image is searched and transmitted during a video call, according to the present invention.

As shown in FIG. 4, when a call for a video call is sent, in Step S410, the controller 190 of the mobile communication terminal determines whether a transmission for a substitute image is set and checks that the transmission is not set, in Step S420. The controller 190 checks information corresponding to capture time, information identifying an opposite party, such as a phone number, and location information including location and movement information of a current mobile communication terminal, in S430, as current video call situation information. When the video call is initiated, the controller 190 automatically records the user's image until the video call is terminated, in Step S440. Next, the controller 190 tags the recorded image with the checked information, which becomes a substitute image, and then stores the substitute image in a storage unit, such as a substitute image-storing box, in Step S450.

Such automatically stored substitute images are sorted and searched by the tags. For example, after preparing a tag table as following Table 3, such a search can be performed referring thereto.

TABLE 1

| Substitute image | Tag | | | |
| --- | --- | --- | --- | --- |
| | | Location | | |
| | Time | Place | Movement State | Opposite party ID |
| 001 | Afternoon | Seoul Myeong-dong | Moving | 010xxxxxxxx |
| 002 | Dawn | Busan Haeundae | Stop | 016xxxxxxxx |
| 003 | Evening | Seoul Gangnam Station | Moving | 017xxxxxxxx |
| 004 | Morning | Ilsan Lake Park | Stop | 011xxxxxxxx |
| ... | ... | ... | ... | ... |

When a call for a video call is received by a mobile communication terminal having a tag table for a substitute image as described in Table 1 and transmission for a substitute image is set, the controller 190 automatically searches for a substitute image. When current situation information is checked, such as current time is evening, the place is near Gangnam Station, and the mobile communication terminal is moving, the controller searches for a substitute image having a tag consistent with or similar to the current situation. Then, as described in Table 1, the substitute image in 003 is automatically searched and then transmitted to an opposite video party's terminal when the video call is initiated. Here, since the tags, such as "time," "place," "movement," are employed for convenience, it will be easily appreciated that the tags can be described by using codes or symbols, such as 00, 01, AA, AB, A1, etc.

FIG. 5 is a flow chart describing a process where a substitute image is stored and transmitted, simultaneously, according to an embodiment of the present invention.

As shown in FIG. 5, when a call of a video call is received, in Step S510, the controller 190 of the mobile communication terminal checks whether a transmission for a substitute image is set, and determines that the transmission for a substitute image is set, in Step S520. The controller 190 checks: a current time, as a current video call situation, through base station time information, etc.; a current location and a state where the mobile communication terminal is moving by checking a cell ID or GPS information, etc.; and a phone number of an opposite party through the received call in Step S530. Next, the controller 190 searches for tags of the previously stored substitute images, and then searches a substitute image tagged with time information consistent with or similar to current time, situation information consistent with or similar to the checked place and movement situation, and a phone number consistent with the phone number of the opposite party, in Step S540. After completing the search, when the video call is initiated, in Step S550, the controller 190 transmits the searched substitute image to the opposite party and, at the same time, automatically records a user's image captured by the camera, in Step S560. When the video call is terminated, in Step S570, the controller 190 stops the transmission of the substitute image and the record of the user's image, in Step S580. Next, the controller 190 tags the recorded image with the checked information of Step S530, which is a substitute image, and then stores the substitute image in a storage unit, such as a substitute image-storing box.

As described in the foregoing, a mobile communication terminal and method according to the present invention can automatically store user's image while making a video call, thereby easily securing images used for a substitute image. Also, the present invention can automatically search for images suitable to a corresponding situation when a substitute image is use in the video call and then transmit the searched image as a substitute image to an opposite party, thereby preventing privacies of video callers from exposing.

In addition, the present invention enhances convenience of using a substitute image when making a video call, thereby increasing video call and thus contributing the development of mobile communication terminal technology.

While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. A mobile communication terminal for providing a substitute image for a video call, comprising:
    a camera for capturing a substitute image;
    a transceiver for performing transmission/reception of a signal;
    an image processor for processing an image signal inputted through the camera or the transceiver;
    a display for displaying the image processed by the image processor;
    a storage unit for storing the substitute image;
    a location-reading unit for receiving a location signal; and
    a controller for searching for one of substitute images stored in the storage unit, which has information, similar to information related to current situation information including a current location checked by the location-reading unit, and for transmitting the searched substitute image to an opposite terminal.

2. The terminal of claim 1, wherein, when the transmission of a substitute image is set while making a video call, the controller searches for one of the substitute images stored in the storage unit, which has information consistent with or similar to a current video call situation and transmits the searched substitute image to the opposite terminal through the transceiver when the video call is initiated.

3. The terminal of claim 2, wherein, when a number of searched substitute images is more than two, the controller transmits one of the searched substitute images, selected by a user, to the opposite terminal through the transceiver.

4. The terminal of claim 1, further comprising:
a situation-information-preparing unit for preparing situation information related to a photo-capturing-situation including location information checked by the location-reading unit.

5. The terminal of claim 4, wherein the controller transmits the substitute image, simultaneously operates the camera to capture the user's image, and stores this image together with situation information prepared by the situation information-preparing unit in the storage unit.

6. The terminal of claim 4, wherein, when transmission for a substitute image is not set while making a video call, the controller stores an image, captured through the camera during a video call, together with situation information prepared by the situation-information-preparing unit in the storage unit.

7. The terminal of claim 4, wherein the situation information is prepared and stored in a tag format.

8. The terminal of claim 4, wherein:
the situation information is information to search for a substitute image suitable to a corresponding situation during the video call; and
the situation information comprises time information, location information, and information on an opposite party.

9. A method for providing a substitute image for a video call in a terminal, the method comprising the steps of:
generating a call for a video call to an opposite terminal;
determining whether a transmission for the substitute image is set; and
when the transmission for the substitute image is set, checking a current situation including a current location of the terminal, searching for a substitute image stored in a storage unit, which has situation information similar to the current situation including the current location of the terminal, and transmitting the searched substitute image to the opposite terminal.

10. The method of claim 9, when a number of the searched substitute images is at least two, the method further comprises:
displaying the at least two searched substitute images to a user of the terminal; and
transmitting one of the at least two searched substitute images, selected by the user, to the opposite terminal.

11. The method of claim 9, wherein when the transmission of for the substitute image is not set, the method further comprises:
automatically recording an image captured by a camera when the video call is initiated;
checking situation information of the video call;
tagging the recorded image with the checked situation information; and
storing the recorded image.

12. The method of claim 9, wherein the situation information is prepared and stored in a tag format.

13. The method of claim 9, wherein the situation information comprises time information, the location information, and information about the opposite party.

* * * * *